Nov. 7, 1933.  E. T. FRANZEN ET AL  1,934,417
FILM SPLICING MACHINE
Filed Nov. 19, 1932  4 Sheets-Sheet 4
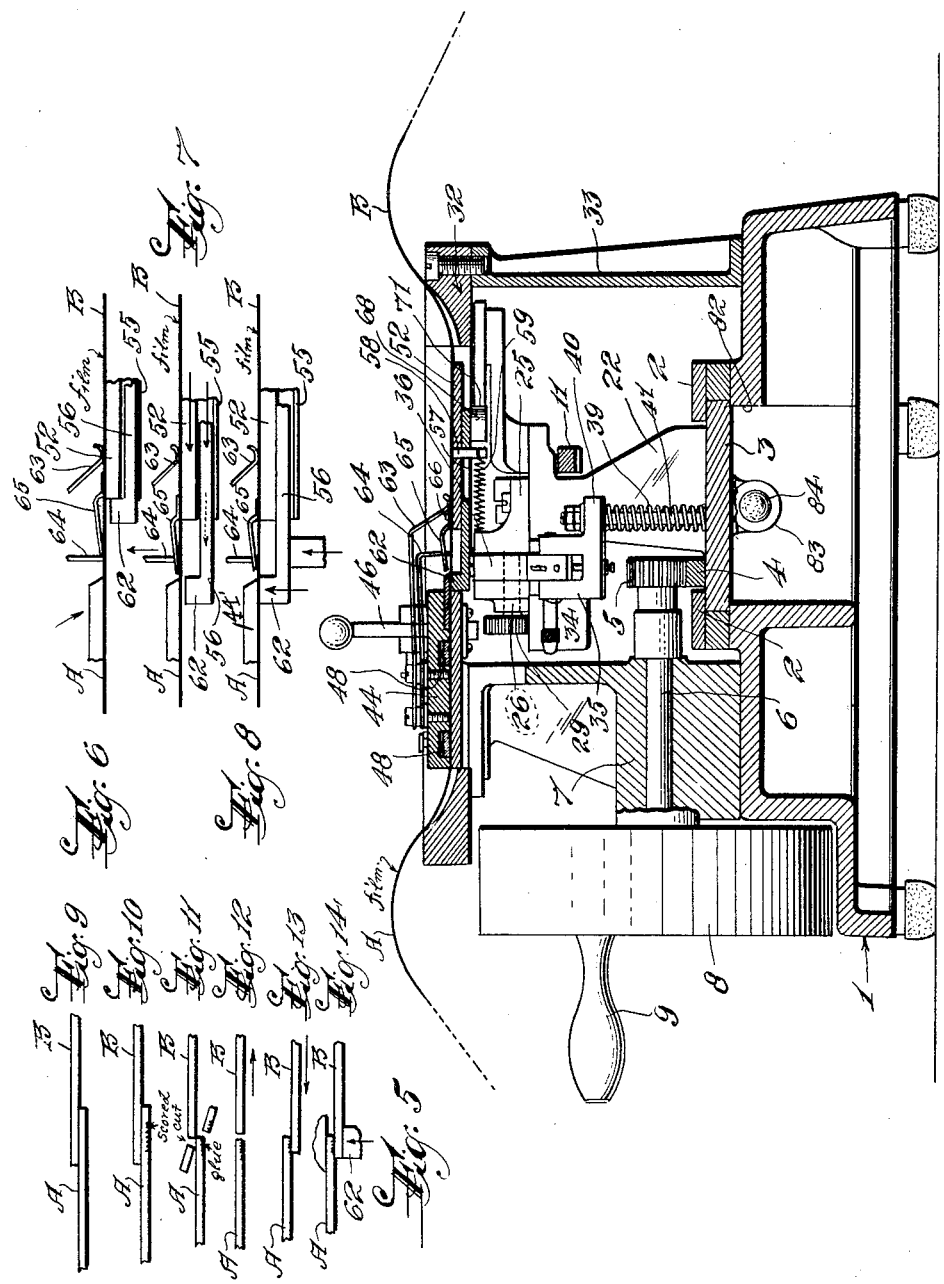

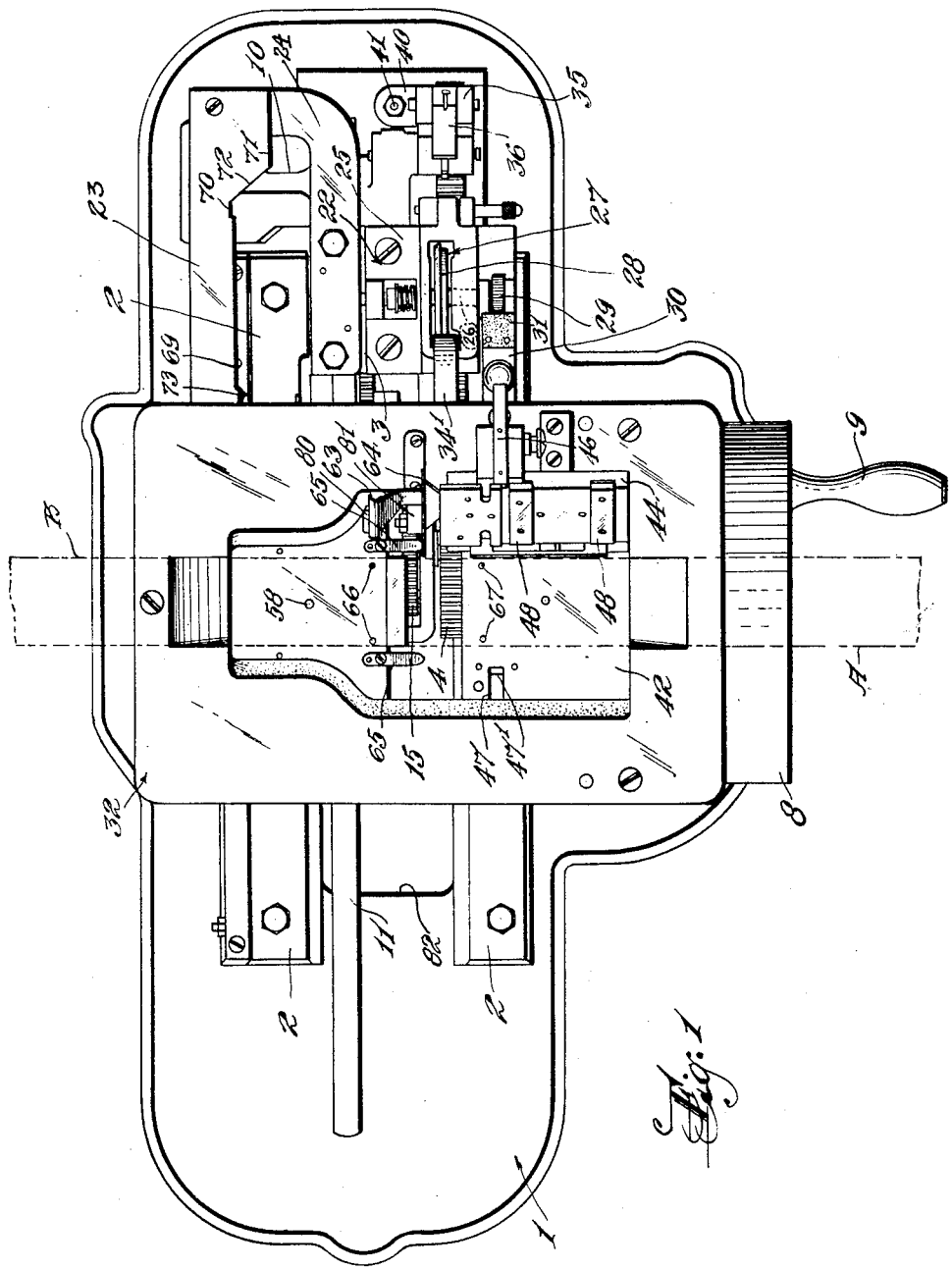

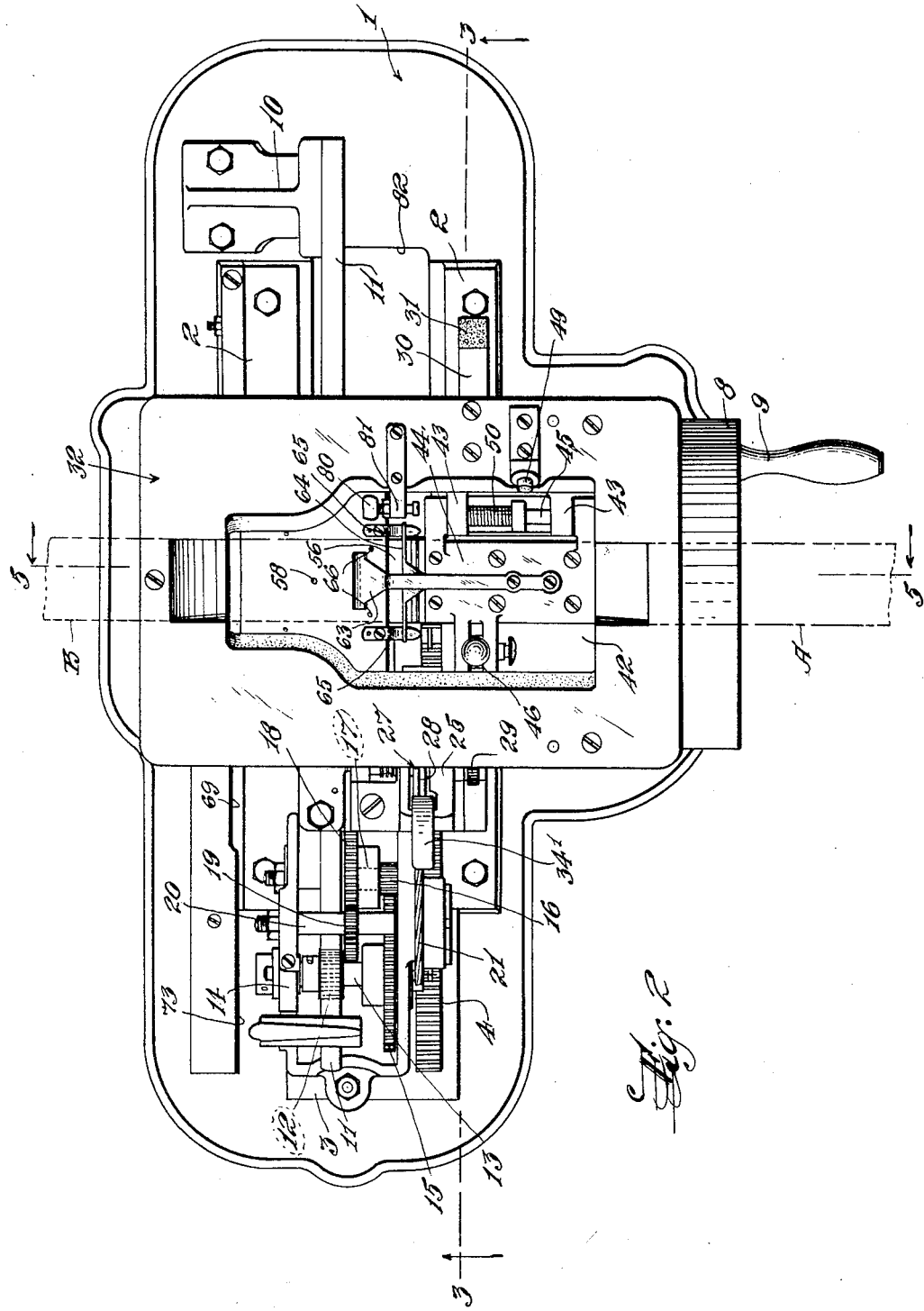

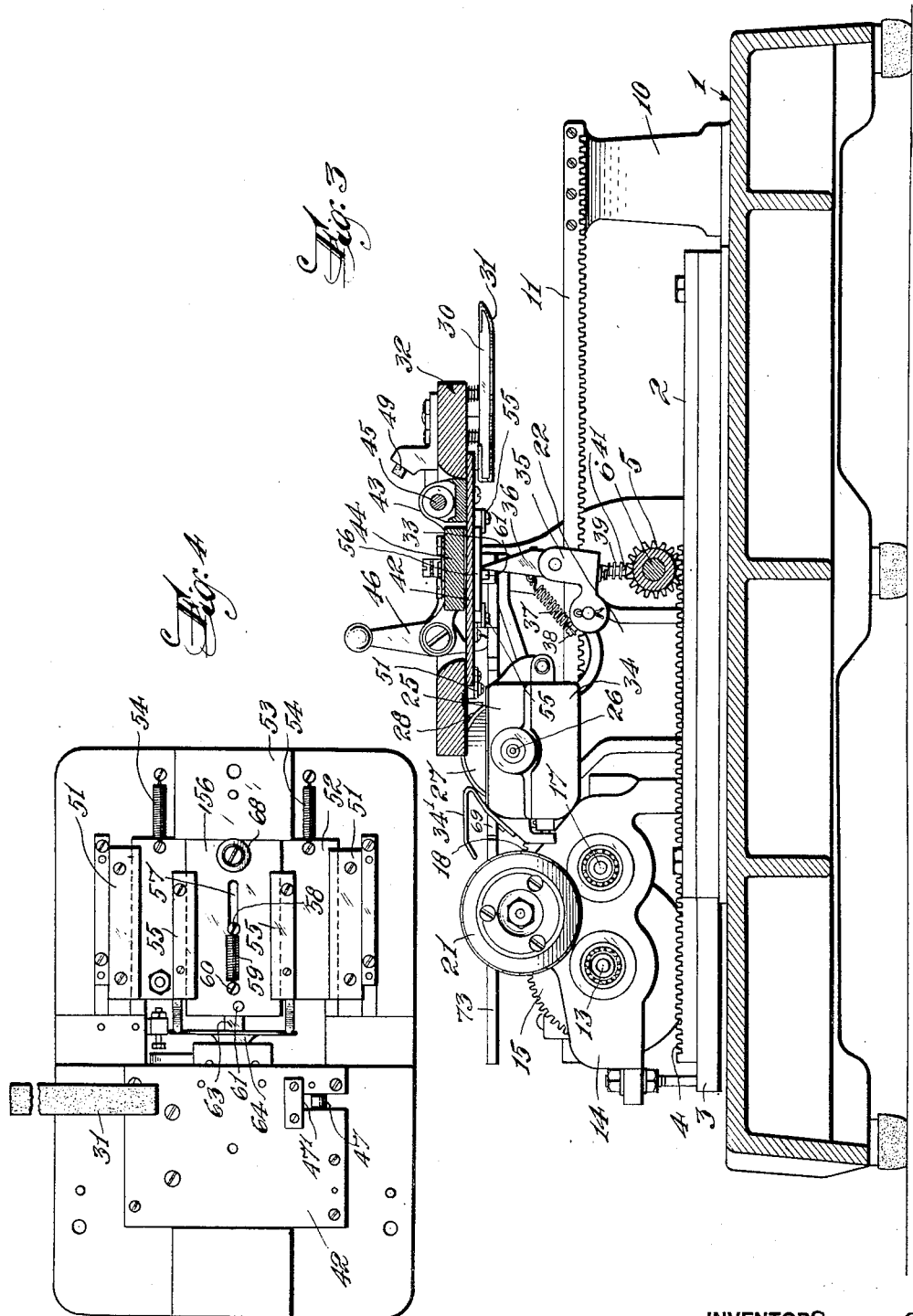

Patented Nov. 7, 1933

1,934,417

UNITED STATES PATENT OFFICE 1,934,417

FILM SPLICING MACHINE

Eric T. Franzen, Maplewood Township, Essex County, and Arthur J. Weiss, West Orange, N. J., assignors to Franklin-Williams, Inc., Orange, N. J., a corporation of New Jersey Application November 19, 1932
Serial No. 643,380

11 Claims. (Cl. 154—42)

This invention relates to improvements in film splicing machines such as are used to repair film strips of celluloid or similar material employed as the medium for carrying a series of photographs for motion picture projection.

Such films are fragile and brittle, and frequently are torn and cracked, which condition is liable to cause separation of the film during projection. Accordingly, it is the usual practice to inspect the film after each projection for defects; and promptly on discovery, to repair the defects. Since it is necessary to inspect many hundreds of feet of film, it is essential that the repairing and splicing operations be rapid and convenient.

While machines have been heretofore produced for automatically splicing film strips, it is an object of our invention to provide an improved machine for automatically splicing film, our machine having relatively few parts and operable by manually rotating a crank to automatically scrape and clean a film, cut, apply adhesive, and apply pressure to the joint, and stop movement of the parts.

It is a further object of our invention to provide a guard to prevent buckling of the film strips after they have been scraped and cleaned and before they are cut.

A further object is the provision of a device for simultaneously cutting and applying an adhesive to the film strip.

A further object is the provision of means to insure the proper alinement and registering of two sections of film strip being spliced together.

These and other advantageous objects, which will later appear, are accomplished by the simple and practical construction and arrangement of parts hereinafter described and exhibited in the accompanying drawings, forming part hereof, and in which:

Fig. 1 is a plan view of the machine at the beginning of its splicing operation, Fig. 2 is a similar plan view showing the machine at the end of a splicing operation, Fig. 3 is a sectional view taken on line 3—3 of Fig. 2, Fig. 4 is a bottom view of film supporting plates used in the machine, Fig. 5 is a sectional view taken on line 5—5 of Fig. 2, Figs. 6, 7 and 8 show various movements of plates during the cycle of operation of the machine, and Figs. 9, 10, 11, 12, 13 and 14 diagrammatically show positions assumed by the film strips during the splicing operation.

Referring to the drawings, in Figs. 2, 3 and 5, the machine is shown to include a base 1, to which is attached a pair of spaced channelled guides 2, in which is slidably positioned a plate 3, having at one side and extending longitudinally thereof a rack 4, which engages a pinion 5 fixed to a shaft 6, journalled in a support 7; the shaft being fixed to a weighted crank or flywheel 8, which is provided with a handle 9.

Attached to the base 1 is a support 10, (see Fig. 3) on which is mounted a rack 11, extending longitudinally of the machine, the rack 11 engaging a pinion 12 fixed to a shaft 13 journalled in a frame 14 supported by the plate 3. The shaft 13 has fixed thereon a large gear 15 in mesh with a relatively small gear 16 fixed to a shaft 17 which has also fixed thereto a large gear 18 in mesh with a small gear 19 fixed to a shaft 20, to which shaft is fixed a wheel 21 having its periphery spirally cut for the purpose of cleaning and scraping the emulsion from the film to be spliced. The shafts 17 and 20 are journalled in the frame 14 also.

In operation, when the flywheel 8 is rotated the pinion 5 drives the rack 4 to move the plate 3 longitudinally of the machine; and movement of the plate 3 causes the rack 11 to rotate the pinion 12 to impart movement to the intermediate gearing for the purpose of rotating the scraping and cleaning wheel 21 at a very high speed; the weighted flywheel enabling an even and steady movement of the parts.

Supported by a member 22 mounted on the plate 3 is a brace 24 to which is attached a cam bar 23 for a purpose hereinafter explained.

Also attached to the support 22 is a frame 25 in which is journalled a shaft 26 on which is mounted the flanged wheel 27 having a sharp cutting edge 28. The shaft has also fixed thereto a knurled disc 29 which frictionally engages a shoe 30 having its surface covered with a strip of leather 31 or similar material, which is resiliently supported by a plate 32 mounted on the vertical supports 7 and 33. The cutting wheel 27 dips into a pool of an adhesive substance carried in a receptacle 34 supported by the frame 25.

Attached to the frame 25 between the scraper 21 and the cutting wheel 27 is a guard 34' formed by bending a flat strip of metal, the upper surface of the guard being horizontal and providing a surface to support a film strip to prevent buckling during the movement over the space between the scraper and the cutting wheel.

Pivotally mounted on the member 22 is an angled member 35, having a pawl 36 pivotally connected to the upper end thereof, the pawl being normally maintained in an upright position, by a tension spring 37 connected to the pawl and to a pin 38 on the member 35, (see Fig. 3). Clockwise rotation of the member 35 is resisted by a compression spring 39 which encircles a post 41 projecting upwardly from the plate 3 and passing through a lateral extension 40 on the member 35.

The plate 32 has its center portion cut out, and attached to the underside of plate 32, (see Fig. 4) is a plate 42 on which is mounted a pair of upstanding ears 43 to which a clamping plate 44 is hingedly connected by means of a pin 45. The plate 44 is provided with a pivoted hasp 46 which engages an edge 47' of slot 47 in the plate 42 to hold the plate 44 positively in a clamped position. The plate 44 is provided with a pair of spaced grooves in which are resiliently supported bars 48, so that the plate 44 will have a resilient clamping action on the film strip; and movement of plate 44 in the opening direction is limited by a stop 49, a coil spring 50 normally tending to move the plate 44 to a raised position as shown in Fig. 1.

Spaced from plate 42 and slidably supported in guides 51 on the underside of plate 32 is a plate 52, which is normally maintained against a stop 53, attached to plate 32, by tension springs 54. Attached to the underside of plate 52, are channelled guides 55 which slidably support a plate 56, having a slot 57, through which projects from plate 52 a pin 58, having connected thereto a tension spring 59 which is also connected to a pin 60 on plate 56 to normally maintain the plate 56 in a predetermined position substantially against the stop 53.

Projecting downwardly from plate 56 is a pin 61 adapted to engage the pawl 36 for a purpose hereinafter explained.

The plate 56 has attached to its upper side on its edge nearest plate 42, a bar 62, the upper surface of which is flush with the upper surface of plate 52.

In operation, a film strip section A is positioned on the plate 42 with the pins 67 passing through the usual lateral perforations on the film strip at the space between two photographs or frames on the film strip, allowing a portion of the film strip to project in the space between plates 42 and 52. A film strip B, which is to be spliced to the strip A is similarly positioned on the plate 52 by means of the pins 66, so that a portion of strip B projects into the space between plates 42 and 52. The clamping plate 44 is then moved downwardly to cause the hasp 46 to engage the edge of the slot 47 to resiliently clamp the film strip B onto plate 42. Fixed to clamping plate 44 is a leaf spring finger 63 which projects over and resiliently holds film strip B in position.

A second leaf spring member 64 is attached to plate 44 and has a downwardly extending portion positioned in the space between plates 42 and 52, the member 64 resiliently engaging the portions of the film strips A and B lying in that space, and the downward movement of the member 64 is resiliently limited by resilient fingers 65 engaging portions of members 64, the fingers 65 being attached to plate 52.

The scraper and cutter, etc., are now in the position shown in Fig. 1. A positive force is applied to the flywheel 8 to cause rapid rotation of the scraper 21 which scrapes and cleans the emulsion from a section of one of the film strips. During this movement of the scraper, plates 52 and 56 are stationary and the guard 34' supports the film strips and prevents buckling thereof during the period when the strip is passing from the scraper to the cutting wheel 27. During this period, the roller 68 on plate 56 rides on the surface 73 of the cam bar 23, to move the bar 62 under the film and member 64 to provide support during the scraping action.

After the scraping action, the roller 68 rides on surface 69 to move the bar 62 back as shown in Fig. 6 to allow the cutter to freely cut the film and apply adhesive thereto. The cutter is given a rotary movement by the frictional engagement of the shoe 30 with the knurled disc 29.

Immediately after the cutting and adhesive applying operation, the roller 68 rides on surface 70 of the cam bar 23, to give a slight shifting movement of the plates 42, and 56 to align and cause proper registration of the film strips; after which the roller rides up over the inclined surface 72 to first move plate 56 towards plate 42, and then upon surface 71 to cause plate 52 to be moved towards plate 42, the movement of plate 52 being limited by a lug 80 thereon engaging a stop 81 mounted on plate 32. These operations when rapidly performed cause shifting and proper registration of the film strip, and the final movement of plate 56 causes the bar 62 to cooperate with member 64 to underlap the film section and to place bar 62 beneath the splice and beneath a portion 44' of plate 44, (see Fig. 8) so that the splice is pressed between the two plates. At this time the pawl 36 engages pin 61, which causes the pawl to move clockwise, (See Fig. 3) against the action of spring 39 to exert a resilient thrust up against bar 62 to tightly press the film strips together to insure proper binding thereof by the adhesive.

The plate 44 is now released and the film strips A and B, now firmly spliced together can be removed from the machine. The flywheel 8, is then rotated to return the parts to the position shown in Fig. 1 preparatory to the next splicing operation.

From the above description, it will be seen that we have provided a comparatively simple manually controlled machine for automatically and effectively splicing motion picture film. The sections of film are automatically aligned and caused to properly register, with no buckling or distortion during the cutting operation, which is performed simultaneously with the application of the adhesive.

The base 1 is provided with a longitudinal slot 82 adapted to receive a buffer lug 83 carried by and projecting downwardly from the plate 3 and freely slidable in the slot, the lug being adapted to engage the end walls of the slot to prevent excessive movement of the plate 3 in either longitudinal direction.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described our invention, what we claim as new and desire to secure by Letters Patent, is:

1. In a film splicing machine, a base, a plate slidably mounted on the base, a rack carried by the plate, a pinion engaging the rack, a shaft to which the pinion is fixed, means to enable the shaft to be manually rotated to cause the rack and pinion to move the plate longitudinally of the base, a support on the base, a second rack mounted on the support and parallel to the first rack, a second pinion rotatably mounted on the plate and engaging the second rack, a film scraping device rotatably mounted on the plate, and a gear train connecting the second pinion to the scraping device.

2. In a film splicing machine, a base, a plate slidably mounted on the base, manually controlled means to move the plate longitudinally of the base, a film scraping device rotatably mounted on the plate, means controlled by the longitudinal movement of the plate to cause the film scraping device to rotate, and a cutting device rotatably mounted on the plate, said cutting device coming into operation after the scraping device.

3. In a film splicing machine, a base, a plate slidably mounted on the base, manually controlled means to move the plate longitudinally of the base, a circular cutting device rotatably mounted on the plate, a receptacle surrounding said cutting device, and a liquid adhesive contained in the receptacle, said cutting device passing through the adhesive so that it will simultaneously cut and apply adhesive to a film strip.

4. In a film splicing machine, a slidably mounted plate, manually controlled means to move the plate, a film scraping device rotatably mounted on the plate, a film cutting device rotatably mounted on the plate and following said scraping device, a plate positioned above said cutting and scraping devices to support film strips to be spliced, and means controlled by the movement of the first-mentioned plate to adjust the film strips to various positions during the scraping and cutting actions and during the application of adhesive thereto.

5. In a film splicing machine, a base, a carriage movably mounted thereon, manually controlled means to move the carriage longitudinally of the base, a film scraping device rotatably supported by the carriage, a cutting device rotatably supported by the carriage and following the scraping device, a quantity of adhesive carried by the carriage and having the cutting device dipping therein, a plate to support one of the film strips to be spliced, a second plate slidably associated with the first plate to support the second film strip to be spliced, cam means on said second plate and carriage to move the second plate to adjust the film strips to various positions during the actions of scraping, cutting and applying adhesive thereto, and means resiliently mounted on the carriage to press the film strips tightly together after the application of the adhesive.

6. In a film splicing device, a base, a carriage mounted on the base, means to move the carriage longitudinally on the base, a shaft rotatably mounted on the base, a circular cutting device fixed to the shaft, a knurled wheel fixed to the shaft, a receptacle containing an adhesive mounted on the base and partially surrounding the cutting device, said cutting device passing through the adhesive during the rotation thereof, and a stationary shoe frictionally engaging the knurled wheel to rotate the shaft to cause the cutting device to pass through the adhesive.

7. In a film splicing device, a base, a carriage mounted for longitudinal movement thereon, a scraping device rotatably mounted on the carriage, a cutting device rotatably mounted on the carriage and following the scraping device, and a guard mounted on the carriage and positioned between the scraping device and the cutting device to prevent buckling of the film.

8. In a film splicing machine, a carriage, a base upon which said carriage is movably mounted, a film scraping device rotatably supported by the carriage, a cutting device rotatably supported by the carriage and following the scraping device, a guard mounted on the carriage and positioned between the scraping device and the cutting device to prevent buckling of the film, a quantity of adhesive carried by the carriage and having the cutting device dipping therein, means to support the strips of film being spliced, cam means controlled by the movement of the carriage to adjust the film strips to various positions during the actions of scraping, cutting and applying adhesive thereto, and means mounted on the carriage to press the film strips tightly together after the application of the adhesive.

9. In a film splicing machine, a base, a carriage longitudinally movable on the base, a scraping device rotatably mounted on the base, a device for simultaneously cutting and applying adhesive rotatably mounted on the base, a support for the strips of film being spliced, cam means controlled by the movement of the carriage to adjust the film strips to various positions during the scraping, cutting and adhesive applying operations, means to reverse the overlapping condition of the film strips after the application of the adhesive thereto, and means to tightly press the film strips together to assist the binding action of the adhesive.

10. In a film splicing machine, a movable carriage having a scraping device and a cutting device rotatably mounted thereon, a guard positioned between said devices to prevent buckling of the film, means associated with the cutting device to enable the simultaneous cutting and application of an adhesive to the film, a support for the film strips, means controlled by the movement of the carriage to adjust the film strips to various positions during the scraping, cutting and adhesive applying operation, and means to overlap one film strip above the other after the application of adhesive thereto.

11. In a film splicing apparatus, a film holding device comprising a plate, a second plate slidably mounted on the first plate, a hinged cover for resiliently clamping a strip of film to the first plate, a resilient finger projecting from the first plate to hold a film strip in position on the second plate, and means to move the second plate to adjust the film strip to various positions during the splicing operations of the machine.

ERIC T. FRANZEN.
ARTHUR J. WEISS.